Patented Dec. 15, 1936

2,064,359

UNITED STATES PATENT OFFICE 2,064,359

MICROBIOLOGICAL PREPARATION OF 2.3-BUTYLENE GLYCOL

Marinus Adrianus Scheffer, Delft, Netherlands, assignor to N. V. Nederlandsche Gist-en Spiritusfabriek, Delft, Netherlands, a limited-liability company of the Netherlands No Drawing. Application November 6, 1933, Serial No. 696,907. In the Netherlands December 6, 1932

1 Claim. (Cl. 195—43)

In U. S. Patent No. 1,899,156 a process for the microbiological preparation of 2.3-butylene glycol has been described, said process comprising preparing a mash containing fermentable carbohydrate, together with nutrient or assisting agents, such as available nitrogen, a phosphate and a carbonate which favor bacterial development, inoculating the mash with a culture of bacteria capable of producing 2.3-butylene glycol in substantial quantity, blowing air through the mash during the ensuing fermentation and separating resultant butylene glycol. According to that disclosure a fermentation of the carbohydrates is greatly accelerated by conducting an oxygen containing gas, air, through the fermenting mashes.

In U. S. Patent No. 1,899,094, which is closely related to the above mentioned Patent No. 1,899,156 there has been disclosed a process which comprises preparing a fermentable carbohydrate mash, inoculating the mash with a culture of bacteria which under normal conditions of aeration produce 2.3-butylene glycol and subjecting the fermenting mash to such an intensive aeration that acetyl methyl carbinol, which is an oxidation product of 2.3-butylene glycol, is formed.

In the aforesaid Patent No. 1,899,156, therefore, the aeration only contemplates the acceleration of the fermentation process without affecting the nature of the products formed by the fermentation, but according to Patent No. 1,899,094 the aeration and thereby the amount of oxygen conducted through the mash is increased to such an extent that a considerable amount of an oxidation product of butylene glycol is formed.

Considering that the presence of a sufficient amount of oxygen changes the nature of the fermentation products, it would seem evident that the presence of minor quantities of oxygen, such as caused by the moderate aeration described in Patent No. 1,899,156, has an accelerating action on the fermentation by its specific physiological action on the bacteria in question.

Now, however, it has been found that the accelerating action of aeration is not due to a specific physiological action of oxygen, but is due to the reduction in the concentration of the evolved carbonic acid in the fermenting medium.

The surprising fact is, therefore, that the same considerable abbreviation of the time of fermentation, which may be obtained by conducting oxygen containing gases such as air through the mash, is also obtained when gases free from oxygen and carbon dioxide are used, such as nitrogen or hydrogen; and that even the removal of carbonic acid by effecting the whole fermentation under a considerably reduced pressure gives the same favourable result. This discovery accordingly leads to a simplified process for the 2.3-butylene glycol fermentation, because in those factories where compressed gases free from carbon dioxide and oxygen are available these gases may be used and no separate air compression is necessary for carrying out the process; and, if such gases are not available, the acceleration of the fermentation may be effected by maintaining a reduced pressure. In this case the costs of maintaining a vacuum are compensated by the possibility of recovering the fermentation gases, which consist exclusively of a mixture of carbon dioxide and hydrogen, without admixture of oxygen, nitrogen or other inert gases.

Consequently, the recovery of these gases in pure condition may be carried out with profit.

The invention is illustrated but not limited by the following examples:—

*Example 1*

20 kg. superphosphate and 50 kg. ground limestone are added to a mash containing 2000 kg. beet molasses diluted with water to 10,000 liters and boiled for 15 minutes. After cooling at 35° C. the mash is inoculated with a pure culture of aerobacter aerogenes in a mash of the same composition.

After 4 hours the fermentation gas of a butyl alcohol fermentation, which is freed from the greater part of its carbon dioxide by washing and which consists of 97% hydrogen and 3% carbon dioxide, is conducted through the fermenting mash at the rate of 70 m³ per hour. The fermentation is finished after 30 hours.

The gases escaping from the glycol fermentation are again freed from carbon dioxide by washing with water and the remaining hydrogen which, consequently, contains also the hydrogen formed in the glycol fermentation, is collected in a gas tank.

The mash is worked up in the usual way, 3.20 kg. 2.3-butylene glycol and 140 liters alcohol (96%) being obtained.

*Example 2*

A mash is prepared according to Example 1 and, 4 hours after inoculation, is brought under a pressure of about 20 cm. mercury absolute, which pressure is maintained during the whole further fermentation. This pressure is only slightly above the vapor pressure of the fermenting mash. The fermentation is finished after 28 hours and produces 320 kg. glycol and 100 liters alcohol (96%).

These examples are given only by way of illustration and are merely typical of procedures within the scope of the invention. For instance, when hydrogen, nitrogen, or other gases are available under pressure, any of these may be used in the procedure described in Example 1 in place of the fermentation gas therein specified. The carbon dioxide content of the gas thus employed may vary although it should always be so low that it may be properly characterized as substantially free from carbon dioxide. Also, when fermenting at reduced pressure, as described in Example 2, the degree of absolute pressure may vary within wide limits so long as it is effective to lower substantially the concentration of carbon dioxide in the mash.

It is also possible to allow the bacteria to settle after finishing the fermentation, to remove the clear liquid which is nearly free from bacteria, and to begin a new fermentation by mixing the settled bacteria with a fresh mash and to repeat this manipulation several times.

What I claim is:—

In the microbiological preparation of 2.3-butylene glycol by subjecting a fermentable carbohydrate mash to fermentation with a culture of bacteria capable of producing therefrom 2.3-butylene glycol in substantial quantity and separating resultant butylene glycol, the process which comprises accelerating the fermentation by conducting through the fermenting mash a gas consisting chiefly of hydrogen.

MARINUS ADRIANUS SCHEFFER.